2,725,368

PREPARATION OF POLYVINYLBENZENE SULFONYL CHLORIDES AND DERIVATIVES THEREOF

Delbert D. Reynolds and John A. Cathcart, Rochester, N. Y., assignors to Eastman Kodak Company, Rochester, N. Y., a corporation of New Jersey No Drawing. Application December 9, 1952,
Serial No. 325,026

5 Claims. (Cl. 260—79.3)

This invention relates to the preparation of polyvinylbenzenesulfonyl chlorides, and more particularly to the preparation of the sulfonyl chlorides of water-soluble sulfonated polystyrenes and derivatives thereof.

In pending application Serial No. 24,676, filed May 1, 1948, in the names of Joseph B. Dickey and Theodore E. Stanin, now U. S. Patent No. 2,618,655, and U. S. Patent 2,616,917, dated November 4, 1952, of Harry W. Coover, Jr., and Joseph B. Dickey, describe the preparation of certain sulfonamidostyrenes and polymers, and certain alkyl styrene sulfonates and polymers, respectively. On each of the above inventions, a monomeric haloarylalkane, e. g. 1-bromo-1-phenyl ethane, 2-bromo-1-phenyl ethane, etc., is sulfonated, reacted with a suitable alcohol or amine, dehydrohalogenated and then polymerized. While the above process does provide a method for preparing a number of resinous polystyrene sulfonamides and sulfonates, it is quite involved because of the several conversions of monomers, dehydrohalogenation, loss of yield in each step, etc., and is also limited in its application, particularly where certain water-soluble sulfonamides and sulfonates having importance as gelatin addenda or as other useful agents in photographic processes are desired, the process failing to give polymers having the required properties. We have now found that highly satisfactory water-soluble polystyrene sulfonamides, and other polystyrene derivatives, can be prepared readily and efficiently by converting a sulfonated polystyrene to the corresponding acid chloride and then reacting the acid chloride with compounds containing a reactive hydrogen e. g. ammonia, an amine, an alcohol, an aminoalcohol, etc.

It is, accordingly, an object of the invention to provide certain polystyrene sulfonamides and sulfonates. Another object is to provide a process for their preparation. Still another object is to provide the intermediate acid chlorides of certain sulfonated polystyrenes and process for preparing the same. Other objects will become apparent hereinafter.

In accordance with the invention, we prepare our resinous polystyrene sulfonamides and sulfonates by first sulfonating polystyrene in ethylene chloride or other chlorinated aliphatic solvent, in the presence of a co-ordination complex of sulfur trioxide and $\beta,\beta'$-dichloroethyl ether. By varying the proportions of the reactants, products can be prepared having an average of about from 0.5 to 2 sulfonic acid groups per styrene unit, preferably from 0.75 to 1.25 sulfonic acid groups per styrene unit. For further details of the sulfonation procedure, reference can be had to M. Baer, U. S. Patents 2,533,210 and 2,533,211, each dated December 12, 1950. After isolation of the granular sulfonic acid derivative, it is suspended in dry benzene or other inert reaction medium with powdered phosphorus penta chloride and heated at from 35° to 80° C., until the conversion of the sulfonic acid groups of sulfonyl chloride groups is substantially complete. The acid chloride of the sulfonated polystyrene thus formed is freed of phosphorus compounds by washing with water and by precipitation into water from a methyl ethyl ketone-acetone solution or dope, and can then be reacted with ammonia to give the corresponding simple sulfonamides; with water to give the corresponding sulfonic acids; with alcohols containing from 1 to 6 carbon atoms (e. g. methanol, propanol, butanol, hexanol, N,N-dimethylaminoethanol N,N-dimethylaminopropanol, etc.) to give the corresponding sulfonates; with primary and secondary aliphatic amines containing from 1 to 4 carbon atoms (e. g. methylamine, ethylamine, propylamine, isopropylamine, butylamine, dimethylamine, etc.) to give the corresponding N-substituted sulfonamides; with primary and secondary aminoalcohols containing from 2 to 6 carbon atoms (e. g. ethanolamine, diethanolamine, 2-amino-1-butanol, hexanolamine, etc.) to give the corresponding N-hydroxyalkyl sulfonamides; with N,N-dialkyl alkane diamines containing from 2 to 4 carbon atoms (e. g. N,N-dimethyl ethanediamine, N,N-dimethyl propanediamine, etc.) to give the corresponding N,N-dialkylaminoalkyl sulfonamides; with arylamines (e. g. aniline, naphthalene, N-methyl aniline, etc.) to give the corresponding N-aryl substituted sulfonamides; with heterocyclic amines (e. g. the C-amino pyridines such as 2-amino pyridine, etc.) to give the corresponding N-heterocyclic group substituted sulfonamides; and similar resinous products with other compounds containing a reactive hydrogen atom. Ordinarily, an excess of the compound containing the reactive hydrogen is used, preferably from about 2 to 10 gram-moles to each gram-mole of the resinous acid chloride. Those of our resinous products containing free hydroxyl groups are especially characterized by being water-soluble and having particular photographic uses. However, all of the resinous products prepared as above described are useful for preparing various coating and impregnating compositions, in suitable solvents with or without, fillers, dyes, pigments, etc.

The following examples will serve to illustrate further the preparation of our intermediate polyvinylbenzenesulfonyl chlorides and certain derivatives thereof.

Example 1

A complex of $\beta,\beta'$-dichloroethyl ether and sulfur trioxide was prepared by dissolving 715 g. (approx. 5 mol) of $\beta,\beta'$-dichloroethyl ether in 2000 g. of ethylene chloride, cooling the solution to −4° C. or less and adding to this solution, 200 g. (2.5 mol) of liquid sulfur trioxide (Sulfan B) with constant stirring and at such a rate that the temperature remained at about −4° C. The solution of the complex just formed was further cooled to −20° C. and a solution of 100 g. (0.96 mol) of polystyrene (Lustrex 15, {$\eta$} in benzene=0.65) in 1900 g. of ethylene chloride was added rapidly with good stirring. The temperature was kept below −5° C. while the polystyrene was added. Then the coolant was removed and the stirring continued for 30 minutes while the temperature rose to 15° C. The product was filtered on coarse sintered glass funnels and washed twice with dry ether. After leaching the hygroscopic sulfonic acid for two hours with dry ether, it was filtered, then suspended in two liters of dry benzene. The sulfonated polystyrene contained approximately 0.75–0.80 sulfonic acid groups per styrene unit. To the vigorously stirred suspension, contained in a 5-liter three-necked flask fitted with thermometer, drying tube and condenser, was added 800 g. (approx. 3.8 mol) of powdered phosphorus pentachloride. The suspension was warmed gradually to 50° C., with evolution of hydrogen chloride beginning at 40–45° C. After 45–60 minutes at this temperature, a yellowing appeared followed by an agglomeration which stopped the stirring. The temperature was held at 50° C. for 45 minutes longer as hydrogen chloride continued to evolve. After cooling somewhat, the benzene was decanted and the still warm polymeric mass was poured onto cracked ice, stirred and broken up. The product was leached overnight in running tap water, then air-dried. A solution of the dried polymer in methyl ethyl ketone-acetone (3:1) was filtered and precipitated into water. After again washing overnight in running tap water, the acid chloride of the sulfonated polystyrene was dried before using. Analysis of the resinous product gave by weight an average value of 49.5 percent of carbon, 4.1 percent of hydrogen, 13.6 percent of sulfur and 13.6 percent of chlorine compared with calculated theory (assuming one SO₂Cl group per styrene unit) of 47.4, 3.5, 15.8 and 17.5 percent for carbon, hydrogen, sulfur and chlorine, respectively. This indicates that the polystyrene sulfonyl chloride obtained as above described had approximately 0.76 nuclear sulfonyl chloride (SO₂Cl) groups per styrene unit, i. e. a polymer comprising a minor portion by molar percentage of

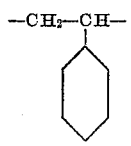

units and a major portion of

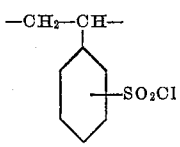

units.

By varying the ratio of the polystyrene to the sulfonating agent in the above example, final products can be prepared which contain from about 0.5 to 2.0 sulfonyl chloride groups per styrene unit. The resinous acid chloride prepared as above described are soluble in organic solvents such as dimethyl formamide, acetone, methyl ethyl ketone, etc.

Example 2

To a rapidly stirred solution of 10 g. (approx. 0.05 mol) of a polyvinylbenzenesulfonyl chloride, obtained by the general process of Example 1, in 100 cc. of acetone, there was slowly added a solution of 10 cc. (approx. 0.15 mol NH₃) of ammonium hydroxide diluted to 25 cc. with acetone. Stirring was continued for 14 hours, after which the product was precipitated into water, washed with alcohol-ether mixture and dried. It was insoluble in water, but readily dissolved in alkalies. Analysis of the resinous product gave by weight 51.4 percent carbon, 5.5 percent hydrogen, 11.4 percent sulfur, 6.1 percent nitrogen and less than 1 percent of chlorine compared with calculated theory for polyvinylbenzenesulfonamide comprising the recurring structural unit

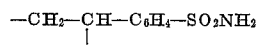

of 52.5, 4.9, 17.5, and 7.65 per cent for carbon, hydrogen, sulfur and nitrogen, respectively.

Example 3

In the same manner as in above Example 2, 10 g. of the polyvinylbenzenesulfonyl chloride were reacted with 15 g. of aniline. The product was precipitated into ether and dried. It was insoluble in water, but readily dissolved in alkalies. Analysis of the resinous product gave by weight 63.5 percent of carbon, 5.6 percent of hydrogen, 11.6 percent of sulfur, 4.7 percent of nitrogen, and less than 1 percent of chlorine compared with calculated theory for polyvinylbenzenesulfonanilide comprising the recurring structural unit

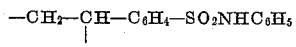

of 65.0, 5.0, 12.4 and 5.4 percent of carbon, hydrogen, sulfur and nitrogen respectively.

Example 4

To a well-stirred solution of 10 g. of a polyvinylbenzenesulfonyl chloride, prepared as set forth in Example 1, in 100 cc. of methyl ethyl ketone, there was slowly added 14 g. of 2-aminopyridine in 50 cc. of methyl ethyl ketone. Stirring was continued for 4 hours, then the reaction mixture was allowed to stand for 18 hours. The product was filtered, extracted with water and then dried. It was insoluble in water and in dilute acids, but readily dissolved in alcoholic potassium hydroxide. Analysis of the resinous product gave by weight 57.4 percent of carbon, 5.0 percent of hydrogen, 11.9 percent of sulfur, 9.2 percent of nitrogen and less than 1 percent of chlorine compared with calculated theory for polyvinylbenzenesulfon-2-amidopyridine comprising the recurring structural unit

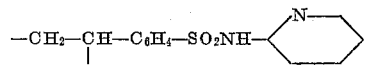

of 60.0, 4.6, 12.3 and 12.3 and 10.2 percent of carbon, hydrogen, sulfur and nitrogen, respectively.

Example 5

To a well-stirred solution of 10 g. of a polyvinylbenzenesulfonyl chloride, prepared as set forth in Example 1, in 150 cc. of dimethyl formamide and methyl ethyl ketone, there was slowly added a solution of 13 g. of p-aminoacetophenone in 30 cc. of methyl ethyl ketone. Stirring was continued for 3 hours as the mixture cleared. After standing for 65 hours, the product was precipitated into absolute ethanol. It was only swollen by water, but was soluble in alcohol-water mixtures and in dilute aqueous alkalies. The resinous product appeared to contain the recurring structural unit $$-CH_2-CH-C_6H_4-SO_2-NH-C_6H_4-CO-CH_3$$

Example 6

To a suspension of 1 part of polyvinylbenzenesulfonyl chloride in 10 parts of water, there was added a drop of pyridine. With stirring, clearing began at once and a clear, colorless solution of polyvinylbenzene sulfonic acid was obtained within a few minutes.

Example 7

To a stirred solution of 10 g. of polyvinylbenzenesulfonyl chloride, prepared as set forth in Example 1, in 75 cc. of dimethyl formamide, there was slowly added 30 cc. of methanol containing 3 g. of dissolved potassium hydroxide pellets. The reaction mixture was chilled in ice water and stirred for 4 hours. After storage for 65 hours, the product was precipitated into methanol, leached in methanol and dried. It was water-soluble. Analysis of the resinous product gave by weight 50.0 percent of carbon, 4.7 percent of hydrogen, 12.5 percent of sulfur and less than 1 percent of chlorine compared with calculated theory for polyvinyl methylbenzene sulfonate comprising the recurring structural unit

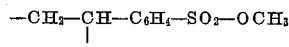

of 54.5, 5.05 and 16.2 percent of carbon, hydrogen and sulfur, respectively.

Example 8

To a stirred solution of 10 g. of polyvinylbenzenesulfonyl chloride, prepared as set forth in Example 1, in 150 cc. of methyl ethyl ketone was added a solution of 6 g. of dimethylaminoethanol in 50 cc. of methyl ethyl ketone. Solid appeared quickly but stirring was continued for 4 hours, then the mixture was allowed to stand 18 hours. The product was filtered out, washed with acetone, dissolved in ethanol-water and precipitated into acetone. It was water-soluble and capable of quaternization with tertiary nitrogen compounds. Analysis of the resinous product gave by weight 53.8 percent of carbon, 7.2 percent by weight of hydrogen, 11.0 percent of sulfur, 5.2 percent of nitrogen and less than 1.6 percent by weight of chlorine compared with calculated theory for polyvinyl-2-dimethylaminoethyl benzene sulfonate comprising the recurring structural unit

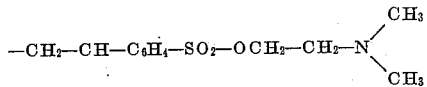

of 56.5, 6.6, 12.5 and 5.5 percent of carbon, hydrogen, sulfur and nitrogen, respectively.

Example 9

To a stirred solution of 10 g. of polyvinylbenzenesulfonyl chloride, prepared as set forth in Example 1, in 75 cc. of dimethylformamide, there was slowly added, with cooling, 12 g. of ethanolamine diluted with an equal volume of dimethylformamide. Stirring with cooling was continued for 30 minutes, then without cooling for 30 minutes longer. After standing for about 3 hours, the product was precipitated into absolute ethanol, leached with ethanol and dried. It was water-soluble. Analysis of the resinous product gave by weight 50.8 percent of carbon, 5.8 percent of hydrogen, 12.9 percent of sulfur, 5.2 percent of nitrogen and less than 1 percent of chlorine compared with calculated theory for polyvinylbenzene sulfon-(N-hydroxyethyl)-amide comprising the recurring structural unit $$-CH_2-CH-C_6H_4-SO_2-NH-CH_2-CH_2-OH$$

of 53.0, 5.7, 14.1 and 6.2 percent of carbon, hydrogen, sulfur and nitrogen, respectively.

Example 10

In the same manner as Example 9, 17 g. of 2-amino-1-butanol was reacted with 10 g. of the polyvinylbenzenesulfonyl chloride to give a water-soluble resinous product which analyzed by weight 53.6 percent of carbon, 6.7 percent of hydrogen, 11.1 percent of sulfur, 4.3 percent of nitrogen and less than 1 percent of chlorine compared with calculated theory for polyvinylbenzenesulfon-(N-1-ethyl-2-hydroxyethyl)-amide comprising the recurring structural unit

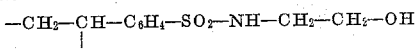

of 56.5, 6.6, 12.5 and 5.5 percent of carbon, hydrogen, sulfur and nitrogen, respectively.

Example 11

The process was the same as Example 9 except that 23 g. of 2-amino-2-methylpentanol-4 was reacted with 10 g. of the sulfonyl chloride to give a water-soluble resinous product which analyzed by weight 56.0 percent of carbon, 7.4 percent of hydrogen, 7.3 percent of sulfur, 4.0 percent of nitrogen and less than 1 percent of chlorine compared with calculated theory for polyvinylbenzenesulfon-(N-1-dimethyl-3-hydroxybutane)-amide comprising the recurring structural unit

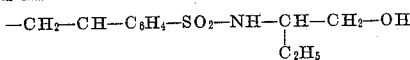

of 59.4, 7.4, 11.3 and 4.95 percent of carbon, hydrogen, sulfur and nitrogen, respectively.

Example 12

The process was the same as Example 9 except that 20 g. of diethanolamine was reacted with the 10 g. of polyvinylbenzenesulfonyl chloride to give a water-soluble resinous product which analyzed by weight 51.0 percent of carbon, 6.6 percent of hydrogen, 9.4 percent of sulfur, 4.8 percent of nitrogen and 2.3 percent of chlorine compared with calculated theory for polyvinylbenzenesulfon-(N,N-dihydroxyethyl)-amide comprising the recurring structural unit

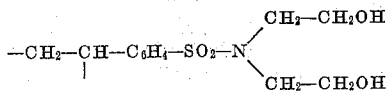

of 53.1, 6.3, 11.8 and 5.2 percent of carbon, hydrogen, sulfur and nitrogen, respectively.

Example 13

The process was the same as Example 9 except that 15 g. of N,N-dimethyl-1,3-diaminopropane was reacted with the 10 g. of polyvinylbenzenesulfonyl chloride to give a water-soluble resinous product which analyzed by weight 51.1 percent of carbon, 6.0 percent of hydrogen, 11.5 percent of sulfur, 5.3 percent of nitrogen and 0.0 percent of chlorine compared with calculated theory for polyvinylbenzenesulfon-(N-3-dimethylaminopropyl)-amide comprising the recurring structural unit

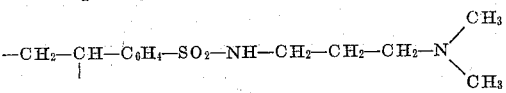

of 58.3, 7.5, 11.9 and 10.4 percent of carbon, hydrogen, sulfur and nitrogen, respectively.

Example 14

A solution of 1 cc. of concentrated ammonium hydroxide in 30 cc. of water was added, with stirring, to a solution of 10 g. of polyvinylbenzenesulfonyl chloride, prepared as set forth in Example 1, in 100 cc. of acetone and 40 cc. of methyl ethyl ketone. To the smooth, cloudy dope which was present at the end of 2.5 hours of stirring, there was added from 0.5 to 1.0 cc. of pyridine. After initial clearing, a cloudiness again appeared which increased until the stirrer was stopped by precipitation of the polymer (about 1 hour). The solvents were decanted, the polymer dissolved in dimethyl formamide and precipitated into 95 percent ethyl alcohol and dried. It was soluble in water. Analysis of the resinous product gave by weight 54.4 percent of carbon, 5.6 percent of hydrogen, 12.6 percent of sulfur, 4.5 percent of nitrogen and less than 1 percent of chlorine compared with calculated theory for polyvinylbenzenesulfonamide comprising the recurring structural unit

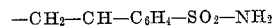

of 52.5, 4.9, 17.5 and 7.65 percent of carbon, hydrogen, sulfur and nitrogen, respectively. However, some sulfonic groups also appear to be present.

Example 15

The process was the same as Example 14 except that 2 cc. of concentrated ammonium hydroxide was used. This product was less soluble in water than that formed in Example 14. It swelled in cold water and was soluble in hot water and in alcohol-water mixtures. Analysis of the resinous product gave by weight 54.4 percent of carbon, 5.6 percent of hydrogen, 12.6 percent of sulfur, 4.5 percent of nitrogen and less than 1 percent of chlorine. However, some sulfonic groups also appear to be present.

By proceeding as set forth in the above examples, other valuable resinous products can be prepared. For example, by reacting certain water-soluble amines in the presence of substantial amounts of water, it is possible to produce a second type of resinous amide, i. e. one containing some sulfonic acid groups. This is illustrated with Examples 14 and 15 where the products result from the reaction of ammonia and water with the polyvinyl benzenesulfonyl chloride to give resinous products which are soluble in either cold or hot water, whereas the product of Example 2 prepared with practically a non-aqueous ammonia has no sulfonic acid groups and is insoluble in water.

The process for preparing the polyvinylbenzene sulfone acids of the invention is subject to a number of variables, for example, the starting material—polystyrene—may be used in different viscosities. Lower or higher degrees of sulfonation may be attained by choice of the dioxane-sulfur trioxide complex or the $\beta,\beta'$-dichloroethyl ether-sulfur trioxide complex as well as the choice of ratio of sulfur trioxide to the coordinating agent. Within limits tried, using an excess of phosphorus pentachloride, there was no relation of degree of sulfonyl chloride formation to time. However, by variation of the amount of phosphorus pentachloride, it is possible to decrease the degree of acid chloride formation.

What we claim is:

1. A two-phase process for preparing a resinous acid chloride comprising reacting in dry benzene a suspension of a sulfonated polystyrene containing from 0.5 to 2.0 sulfonic acid groups per styrene unit with phophorus pentachloride, at a temperature of from 35 to 80° C., until the reaction is substantially complete, and separating the insoluble resinous acid chloride product from the reaction mixture.

2. A two-phase process for preparing a resinous acid chloride comprising reacting in dry benzene a suspension of a sulfonated polystyrene containing from 0.5 to 2.0 sulfonic acid groups per styrene unit with phosphorus pentachloride, in the ratio of from 2 to 10 gram-moles of the phosphorus pentachloride to each gram-mole of the sulfonated polystyrene, at a temperature of from 35 to 80° C., until the reaction is substantially complete, and separating the insoluble resinous acid chloride product from the reaction mixture.

3. A two-phase process for preparing a resinous acid chloride comprising reacting in dry benzene a suspension of a sulfonated polystyrene containing approximately 0.75–0.80 sulfonic acid groups per styrene unit with phosphorus pentachloride, in the ratio of from 2 to 10 gram-moles of the phosphorus pentachloride to each gram-mole of the sulfonated styrene, at a temperature of from 35 to 80° C., until the reaction is substantially complete, and separating the insoluble resinous acid chloride product from the reaction mixture.

4. A two-phase process for preparing a resinous acid chloride comprising reacting in dry benzene a suspension of a sulfonated polystyrene containing approximately 0.5 sulfonic acid groups to each styrene unit with phosphorus pentachloride, in the ratio of from 2 to 10 gram-moles of the phosphorus pentachloride to each gram-mole of the sulfonated polystyrene, at a temperature of from 35 to 80° C., until the reaction is substantially complete, and separating the insoluble resinous acid chloride product from the reaction mixture.

5. A two-phase process for preparing a resinous acid chloride comprising reacting in dry benzene a suspension of a sulfonated polystyrene containing approximately 2.0 sulfonic acid groups to each styrene unit with phosphorus pentachloride, in the ratio of from 2 to 10 gram-moles of the phosphorus pentachloride to each gram-mole of the sulfonated polystyrene, at a temperature of from 35 to 80° C., until the reaction is substantially complete, and separating the insoluble resinous acid chloride product from the reaction mixture.

References Cited in the file of this patent

UNITED STATES PATENTS

| | | |
|---|---|---|
| 2,604,456 | Signer | July 22, 1952 |
| 2,615,000 | Bradley | Oct. 21, 1952 |
| 2,676,896 | Cohen | Apr. 27, 1954 |

OTHER REFERENCES

Whitmore: "Organic Chemistry," pages 167, 189, 772 and 773, Van Nostrand (1937).